United States Patent Office 2,824,396
Patented Feb. 25, 1958

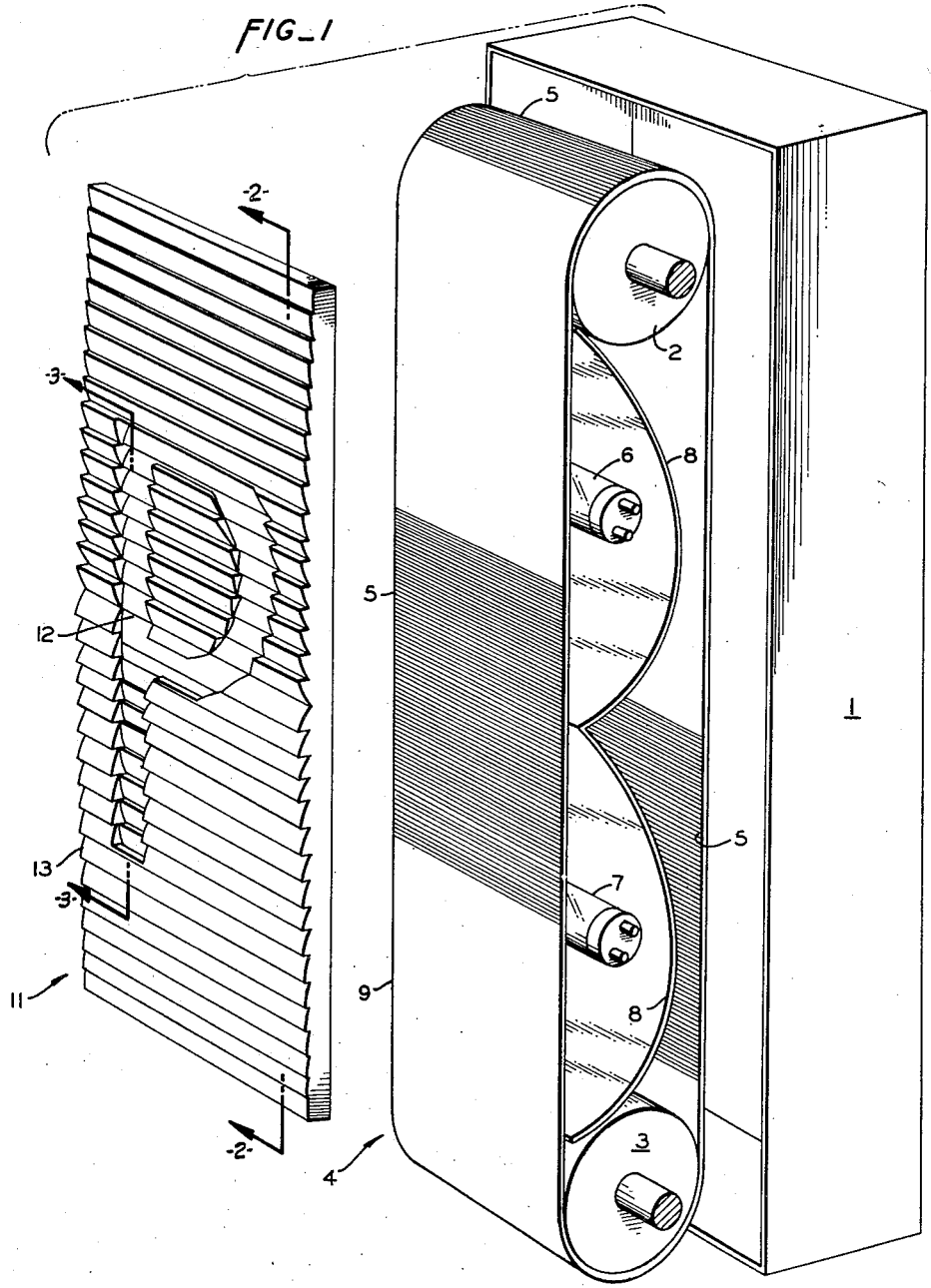

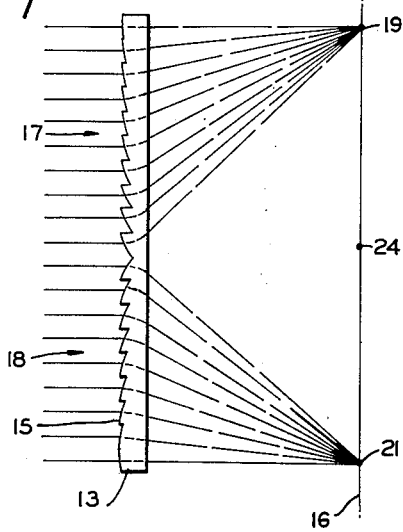
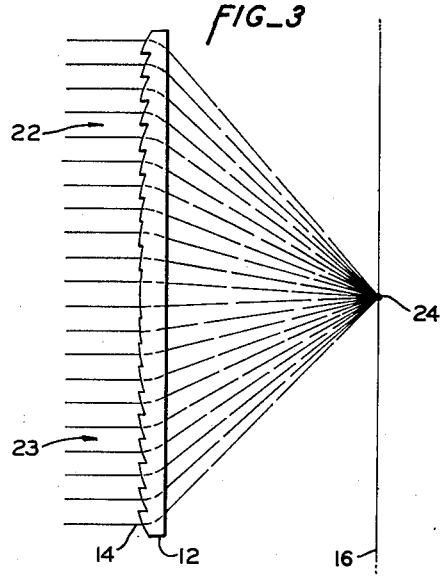
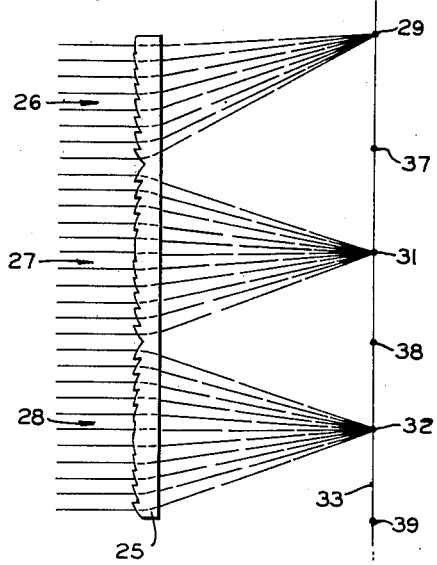
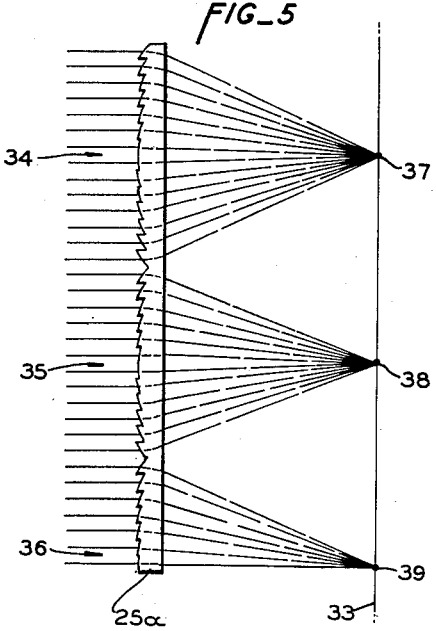

2,824,396

ANIMATED SIGN AND OPTICAL SCREEN THEREFOR

William E. Thomas, San Francisco, Calif., assignor to Prism Signs Inc., San Mateo, Calif., a corporation of California Application February 13, 1956, Serial No. 564,925

4 Claims. (Cl. 40—132)

This invention relates to and in general has for its object the provision of an animated sign wherein the sign indicia is made to appear in one color and the indicia background in another, and wherein means are provided for periodically interchanging such colors.

More specifically, the object of this invention is the provision of an animated sign including: an optical screen having an indicia portion and a background portion made up of parallel, contiguous, cylindrical lens segments all having identical radii of curvature and a common focal plane, but wherein the focal lines of the lens segment of the indicia portion are not colinear with the focal lines of lens segments of the background portion; means rearwardly of said focal plane of illuminating the rear face of said optical screen; and at least one color filter movable in said focal plane progressively across said focal lines.

Referring to the drawings:

Fig. 1 is an isometric projection diagrammatically illustrating an animated sign embodying the objects of my invention.

Fig. 2 is a vertical section taken on the section line 2—2 of Fig. 1, taken through the field or background portion of the optical screen of the sign.

Fig. 3 is a vertical section taken on the section line 3—3 of Fig. 1 through the indicia portion of the optical screen.

Fig. 4 is a vertical section taken through the indicia portion of a modified optical lens screen.

Fig. 5 is a vertical section taken through the background or field portion of the optical screen illustrated in Fig. 4.

As above indicated, the operation of the optical screen of the present sign depends on the fact that the focal lines of the indicia and field portions of the screen are not colinear, and that consequently, these two portions can be separately, although simultaneously, illumined by light of different colors located or passing through the respective focal points of the two screen portions.

For this purpose, each of the screen portions can be made of a plurality of parallel, cylindrical lens segments all having a common focal plane and either one set of colinear focal lines or two or more sets of colinear focal lines, provided, however, that the focal lines of the indicia portion of the screen are not colinear with the focal lines of its field or background portion.

Conveniently, each of such screen portions can be made by first producing a die from which a common mold can be formed. Such a die can be made by rigidly securing a plurality of rectangular metal bars into a solid bundle, machining a cylindrical surface on one face of said bundle, loosening the bundle, and restacking it so that the high points or lines of the cylindrical surface of each of said bars lie on a common plane, and finally clamping the bars, as so rearranged, into a second solid bundle. This second bundle then serves as a die from which a mold can be made and cut either into the desired complementary outlines of the field or the indicia portions of the optical screen. In making the mold for these two screen portions, care should be taken to so position or orient the die segments that the focal lines of the two portions will not be colinear. By then interfitting the complementary field and indicia portions, a composite mold can be made from which any number of composite, transparent, plastic optical screens can be struck.

More specifically, and as illustrated in Fig. 1, the objects of my invention have been embodied in an animated sign comprising an open-ended, generally rectangular casing 1. Journaled within the casing 1 is a pair of vertically spaced, parallel rollers 2 and 3, means not shown being provided for rotating one of these rollers.

Reeved about the rollers 2 and 3 is a transparent endless belt 4 provided with a plurality of spaced color filter sections or panels 5. Mounted within the confines of the endless belt 4 is a pair of horizontally disposed, vertically spaced, fluorescent lighting tubes 6 and 7, and extending across each of these tubes is a reflector 8.

Covering the open end of the casing 1 forwardly of the front reach 9 of the belt 4 is a composite optical screen generally designated by the reference numeral 11 and including an indicia screen portion 12 and a coplanar field or background portion 13. As previously described, both the indicia screen portion 12 and the field portion 13 are made up of a plurality of cylindrical lens segments 14 and 15, respectively, all having a common focal plane 16. Here it is to be noted that the front reach 9 of the belt 4 should preferably be located coplanar with the focal plane 16. As shown in Fig. 2, the field portion 13 of the optical screen is made up of upper and lower sets 17 and 18, respectively, of parallel, convex, cylindrical lens segments, all of the segments of the upper set having an upper common focal line 19 lying on the focal plane 16, and all of the segments of the set 18 having a lower common focal line 21 lying on the focal plane 16. Light originating or passing through the focal lines 19 and 21 and directed forwardly as indicated in Fig. 2 will result in illuminating the lens segments associated therewith. If the light originating at or passing through the focal lines 19 and 21 is colored, the lens segments associated therewith will also be colored.

Similarly, the indicia screen portion, as shown in Fig. 3, consists of an upper set 22 of parallel lens segments and a lower set 23 of reversely directed lens segments all having a single common focal line 24 lying on the focal plane 16. However, it is to be noted from a comparison of Figs. 2 and 3 that the focal line 24 is disposed intermediate the focal lines 19 and 21.

Preferably, the length of each of the color filter sections 5 of the belt is equal to the distance between the focal lines 19 and 24, this distance also being equal to the distance between the focal lines 24 and 21, and the length of the colored portions of the belt should be equal to the length of its uncolored portions. With such an arrangement, light originating at or passing through the focal lines 19 and 21 will serve to illuminate the field portion 13 with one color, whereas light simultaneously originating at, or passing through the intermediate focal line 24 will serve to simultaneously illuminate the indicia portion 12 with either white light or light of a different color. Here it should be noted that the belt 4 can be provided with different colored sections instead of one colored section and one clear section. As the belt 4 moves along and the boundary of two different color sections passes any given focal line, the colors of the indicia and field portions will of course be reversed, and at no time will any part of either the indicia portion or the field portion appear in two different colors.

This expedient therefore provides a simple way for periodically reversing the colors of the field and indicia portions of a sign without having to resort to a plurality of individual lights controlled by a commutator type switch.

In Figs. 4 and 5, a modified type of optical screen has been illustrated wherein the optical screen is made up of a field portion 25 including three sets 26, 27, and 28 of parallel, convex, cylindrical lens segments respectively converging in focal lines 29, 31, and 32 all located in a common focal plane 33, and of a coplanar indicia portion 25a likewise made up of three sets 34, 35, and 36 of parallel, convex, cylindrical lens segments respectively converging in focal lines 37, 38, and 39 lying on the common focal plane. It is to be noted, however, that although the focal lines 37, 38, and 39 are parallel with the focal lines 29, 31, and 32, they are not colinear therewith, but instead, vertically spaced relative thereto. As in the case of the first modification described, the length of the colored bands or sections of the belt 4 should be equal to the distance between any two consecutive focal lines, such as the lines 29 and 37.

These two variations of optical screens merely illustrate that the indicia and field portions can include any number of focal lines so long as the focal lines of the indicia portion are not colinear with the focal lines of the field portion.

Also, it is to be observed that by making the colored sections of the belt 4 of a length unequal to the distance between consecutive focal lines, an overlapping of the colors of the indicia and field portions can be obtained. More specifically, certain parts of these two portions will at some time be illuminated with light of the same color, although the change from one color condition to another color condition will always be instantaneous.

For purposes of illustration two fluorescent lighting tubes have been shown. However, the only condition here essential is that the entire rear face of the optical screen be illuminated by light either originating at the various focal lines or passing therethrough, and that such light be capable of retracing the path taken by parallel light rays entering the front face of the optical screen and converging in said focal lines in the common focal plane of all of the lens segments of the optical screen.

Also, it is to be noted that the endless belt can be reciprocated up and down instead of continuously rotating it in one direction.

To further visualize the optical screen, it can be considered as a field portion coplanar with and surrounding an indicia portion, wherein both portions consist of parallel, convex, cylindrical lens segments all having a common focal plane, but wherein the focal lines of the indicia portion are distinct from the focal lines of the field portion so that these two portions can be only separately illuminated by light originating at, or passing through these respective focal lines in the direction of their associated lens segments.

Since the die segments used in making the above described optical screen all have a common radius, it follows of course that the lens segments likewise have identical radii, and perforce have a common focal plane and focal lines lying in such plane.

I claim:
1. In an animated sign of the type wherein light is applied to illuminate an optical screen, an optical screen formed of light transmitting and refracting material, said screen including both indicia and field portions, the field portion including a plurality of cylindrical lens segments distributed over a substantial area of the screen, the lens segments all having their foci in a common focal plane on the rear side of the screen, the focal axes of the lens segments also being convergent whereby the foci at said plane are in a substantially linear region, the indicia likewise comprising a plurality of cylindrical lens segments distributed over a substantial area of the screen and all having their foci in said plane and with their focal axes being convergent toward said plane whereby at said plane the foci are localized in a substantially linear region, said last region being displaced from the first region, and means for supplying color modulated light from said regions to said screen, whereby said areas of the screen as viewed from the front thereof are illuminated in changing colors.

2. A sign as in claim 1 in which the color characteristics of light transmitted from the said regions of said plane to the screen vary alternately, whereby as viewed from the front the illuminated areas of the screen vary alternately as to color.

3. In an animated sign of the type wherein light is applied to illuminate an optical screen, an optical screen formed of light transmitting and refracting material and including indicia and field portions, the field portions comprising a plurality of groups of cylindrical lens segments, each group comprising lens segments distributed over a substantial area of the screen, the lens segments of both groups having their foci in a common focal plane at the rear side of the screen and parallel thereto, the focal axes of the lens segments of each group being convergent whereby the foci at said plane are localized in a substantial linear region, the regions for the two groups being spaced apart, the indicia likewise comprising a plurality of cylindrical lens segments distributed over a substantial area of the same and all having their foci in said plane with the focal axes also being convergent whereby at said plane the foci are localized in a substantially linear region, said last named region being spaced from both the first named regions, and means for applying color modulated light from said regions to said screen, whereby said areas of the screen as viewed from the front thereof are subject to recurrent color changes.

4. A sign as in claim 3 in which the last named means includes a color filter member having adjacent light transmitting portions of different color characteristics, said filter member being disposed in said focal plane, and means for continually moving said member to vary the color characteristics of light transmitted to the various screen areas from said regions.

References Cited in the file of this patent
UNITED STATES PATENTS

| | | |
|---|---|---|
| 1,523,384 | Arbuckle | Jan. 20, 1925 |
| 2,082,100 | Dorey et al. | June 1, 1937 |
| 2,175,072 | Wompey | Oct. 3, 1939 |
| 2,419,216 | Hotchner | Apr. 22, 1947 |